(12) United States Patent
Thomasson

(10) Patent No.: US 8,640,969 B2
(45) Date of Patent: Feb. 4, 2014

(54) THERMOSTATIC MIXING VALVE FOR A DOMESTIC HEATING SYSTEM

(75) Inventor: Anders Thomasson, Marbäck (SE)

(73) Assignee: Thermoventiler i Ulricehamn AB, Marbaeck (SE)

( * ) Notice: Subject to any disclaimer, the term of this patent is extended or adjusted under 35 U.S.C. 154(b) by 526 days.

(21) Appl. No.: 13/058,994

(22) PCT Filed: Aug. 15, 2008

(86) PCT No.: PCT/SE2008/000471
§ 371 (c)(1),
(2), (4) Date: Mar. 15, 2011

(87) PCT Pub. No.: WO2010/019078
PCT Pub. Date: Feb. 18, 2010

(65) Prior Publication Data
US 2011/0259437 A1 Oct. 27, 2011

(51) Int. Cl.
*G05D 23/13* (2006.01)
(52) U.S. Cl.
USPC ...................................... 236/12.11
(58) Field of Classification Search
USPC ........... 236/12.11, 12.16, 12.17, 12.18, 12, 2; 137/88
See application file for complete search history.

(56) References Cited

U.S. PATENT DOCUMENTS

| 6,471,132 B1 * | 10/2002 | Knapp | 236/12.2 |
| 7,740,183 B2 * | 6/2010 | Knapp | 236/12.2 |
| 7,744,007 B2 * | 6/2010 | Beagen et al. | 236/12.11 |
| 8,353,462 B2 * | 1/2013 | Todaka et al. | 236/12.11 |

FOREIGN PATENT DOCUMENTS

| DE | 4225178 A1 | 2/1994 |
| EP | 1967935 A1 | 9/2008 |
| GB | 944228 | 12/1963 |
| JP | 04341675 A | 11/1992 |
| SE | 469854 B | 9/1993 |

OTHER PUBLICATIONS

International Search Report from PCT/SE2008/000471 dated Apr. 6, 2009.

* cited by examiner

*Primary Examiner* — Marc Norman
(74) *Attorney, Agent, or Firm* — Alston & Bird LLP

(57) ABSTRACT

The invention relates to a thermostatic mixing valve comprising a hollow body having a first inlet, a second inlet, and an outlet in fluid communication with the first inlet and/or the second inlet via a mixing chamber. The flow through the valve is controlled by an axially extending thermostatic actuator comprising a stem, an enlarged portion and a heat sensitive bulb, said bulb extending into the mixing chamber. The thermostatic actuator is axially displaced between a first end position in which only the first inlet is connected to the outlet and a second end position in which only the second inlet is connected to the outlet. The thermostatic actuator is displaced in a sleeve member arranged to restrict the flow of water from the second inlet past the enlarged portion of the thermostatic actuator during its axial displacement until the thermostatic actuator reaches the second end position.

12 Claims, 5 Drawing Sheets

THERMOSTATIC MIXING VALVE FOR A DOMESTIC HEATING SYSTEM

CROSS-REFERENCE TO RELATED APPLICATIONS

This application is based on PCT/SE2008/000471, filed Aug. 15, 2008, the contents of which are incorporated by reference.

TECHNICAL FIELD

The present invention relates to a thermostatic mixing valve and a domestic heating arrangement using such a valve.

BACKGROUND

In domestic heating arrangements utilising an accumulator means for temporary storage of a heated fluid, such as water, some form of heating arrangement is used for heating the fluid in the accumulator means. For instance, when using a water heating boiler for heating the water in an accumulator tank it is desirable to heat the water in the boiler to a predetermined temperature before charging the accumulator tank with hot water. Once the water circulating in the boiler has reached a predetermined temperature, a thermostatic mixing valve connecting the boiler and the accumulator tank is actuated to initiate a relatively slow charging of the accumulator tank. A slow charging is preferred in order to achieve stratification of the hot and cold water in the accumulator tank. By avoiding mixing of the hot water entering an upper portion of the tank with the cold water drawn from a lower portion of the tank, the hot and cold water will be separated by a boundary layer in a horizontal plane as the tank is gradually filled with hot water.

An example of a thermostatic mixing valve suitable for this purpose is "Laddomat 21"® available from Termoventiler AB. This thermostatic mixing valve will allow water to circulate in the boiler until a predetermined operating temperature is achieved. The valve will then open partially in response to a heat sensitive body in the valve and begin drawing a limited flow cold water from the accumulator tank into the boiler, while a similar flow of heated water from the boiler is supplied to the accumulator tank. This thermostatic mixing valve will operate satisfactorily in domestic heating arrangements with a rated power output up to about 80 kW.

However, the known valve has proven less suitable for smaller heating arrangements with a rated output up to 30 kW. In such relatively small plants the relatively low fluid flow rate and, in some cases, relatively large pressure differences in the fluid system the known valve may experience control problems and cause flow fluctuations.

Hence, a problem with prior art solutions is to achieve a thermostatic mixing valve providing a stable control of the mixing of two fluid flows at relatively low flow rates and/or at relatively large pressure differences in the system.

SUMMARY OF THE INVENTION

The above problems have been solved by a thermostatic mixing valve and a domestic heating arrangement according to the appended claims.

According to a preferred embodiment, the invention relates to a thermostatic mixing valve. The thermostatic mixing valve is preferably used in a domestic heating arrangement or a similar relatively small scale heating arrangement. The mixing valve comprises a hollow body having an first inlet for water, a second inlet for water, and an outlet for mixed water in fluid communication with the first inlet and/or the second inlet via a mixing chamber. The flow of water through the thermostatic mixing valve is controlled by an axially extending thermostatic actuator comprising a stem, an enlarged portion and a heat sensitive bulb, said bulb extending into the mixing chamber. When the heat sensitive bulb is subjected to a temperature equal to or greater than a predetermined temperature, the stem is caused to extend out of the thermostatic actuator causing it to be displaced. The extent of the displacement is a function of the temperature of the water flowing past the heat sensitive bulb. The thermostatic actuator is arranged to be axially displaced between a first end position in which only the first inlet is connected to the outlet and a second end position in which only the second inlet is connected to the outlet. A biasing means is acting on the thermostatic actuator towards the first end position, in which position a portion of the thermostatic actuator is arranged to act as a valve in contact with a valve seat in the hollow body to close the second inlet. The biasing means may comprise any suitable resilient means, such as a coil spring or similar.

The thermostatic actuator is arranged to be displaced in a sleeve member of larger diameter defining a tubular path which extends coaxially with the enlarged portion for conveying water from the second inlet past the thermostatic actuator to the mixing chamber. When the valve is open, said sleeve member surrounding at least the enlarged portion is arranged to restrict the flow of water from the second inlet past the enlarged portion of the thermostatic actuator during its axial displacement until the thermostatic actuator reaches the second end position. In the second position, the first inlet is closed and the entire flow of water passes from the second inlet to the outlet.

The thermostatic mixing valve is operated so that the degree of opening of the valve is arranged to increase as a function of the temperature of the water from at least the first inlet. In an initial operating position, the thermostatic actuator is held in the first end position by the biasing means. The valve is arranged to open if the water flowing from the first inlet past the heat sensitive bulb exceeds a predetermined first temperature. When the valve opens, relatively hot water from the first inlet will flow past the heat sensitive bulb and be mixed with relatively cold water from the second inlet. The relative positions and dimensions of the first and second inlets and the outlet are preferably selected so that the flow paths from the respective first and second inlets are separated as they flow past the heat sensitive bulb. The flow paths are then mixed in the mixing chamber. This arrangement ensures that the temperature of the heat sensitive bulb and the position of the thermostatic actuator are dependent on the temperatures of the water from both inlets. As a result, the temperature of the water leaving the thermostatic mixing valve through the outlet is always lower than the predetermined first temperature that opens the valve while the thermostatic actuator is located between its end positions. When the water from the second inlet is gradually heated, as will be described in greater detail below, the thermostatic actuator will be gradually be displaced towards the second end position. When the water from the second inlet exceeds a predetermined second temperature the thermostatic actuator is arranged to be axially displaced to the second end position and the first inlet will be closed. The said first and second temperatures are preferably, but not necessarily equal. The first inlet may be closed by a portion of the thermostatic actuator or by a sliding valve or similar acted on by the thermostatic actuator.

According to a preferred embodiment, the rate of flow of water from the second inlet is arranged to be controlled by an annular cross-sectional area between the enlarged portion of the thermostatic actuator and the inner wall of the sleeve member. The annular cross-sectional area is measured at right angles to the longitudinal axis of the thermostatic actuator The cross-sectional area is dependent on the cone angle of the inner wall of the sleeve member and is arranged to increase during at least a part of the axial displacement of the thermostatic actuator towards the second end position. According to a preferred example, the rate of increase of the annular cross-sectional area should follow a logarithmic or an approximate logarithmic function.

In a first example, the cross-sectional area is arranged to be constant or substantially constant during an initial part of the axial displacement of the thermostatic actuator. In this example, the inner wall is substantially cylindrical along said initial part. Once the said initial axial displacement has been completed, the cross-sectional area is arranged to increase during the remaining part of the axial displacement of the thermostatic actuator. The rate of increase of the cross-sectional area during the remaining displacement is dependent on the cone angle of the inner wall and may follow any one of the examples listed below.

In a second example, the cross-sectional area is arranged to increase at a constant rate during the entire axial displacement of the thermostatic actuator. For example, the enlarged portion of the thermostatic actuator has a constant maximum diameter over at least a portion of it axial extension, while the inner wall of the sleeve member has a conical shape with a fixed predetermined cone angle.

In a third example, the cross-sectional area is arranged to increase according to a variable function during the entire axial displacement of the thermostatic actuator. For example, the enlarged portion of the thermostatic actuator has a constant maximum diameter over at least a portion of it axial extension, while the inner wall of the sleeve member has a general conical shape, wherein the cone angle may be increased in one or more steps. Alternatively, a cross-section through the sleeve member may show an inner wall with a variable cone angle following a suitable mathematical function, such as a hyperbolic curve.

In a fourth example, the cross-sectional area is arranged to increase according to a logarithmic function during the entire axial displacement of the thermostatic actuator. For example, the enlarged portion of the thermostatic actuator has a constant maximum diameter over at least a portion of it axial extension, while the inner wall of the sleeve member has a cross-section with a variable cone angle following a logarithmic function.

In the examples listed above, suitable cone angles may be selected in the interval 0-20° relative to the central axis of the thermostatic actuator As will be described in further detail below, the first inlet may be connected to an outlet from a water heating arrangement, the second inlet may be connected to an outlet from to an accumulator arrangement, and the outlet from the thermostatic mixing valve may be connected to an inlet for a water heating arrangement.

The invention further relates to a domestic heating arrangement comprising a water heating arrangement, such as a suitable boiler, and an accumulator arrangement, such as an accumulator tank. The water heating arrangement and the accumulator arrangement are connected by a thermostatic mixing valve as described above, wherein the valve comprises a first inlet connected to an outlet from the water heating arrangement, a second inlet connected an outlet from to the accumulator arrangement, and an outlet connected to an inlet for the water heating arrangement.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

DETAILED DESCRIPTION OF THE INVENTION

Figure 1:
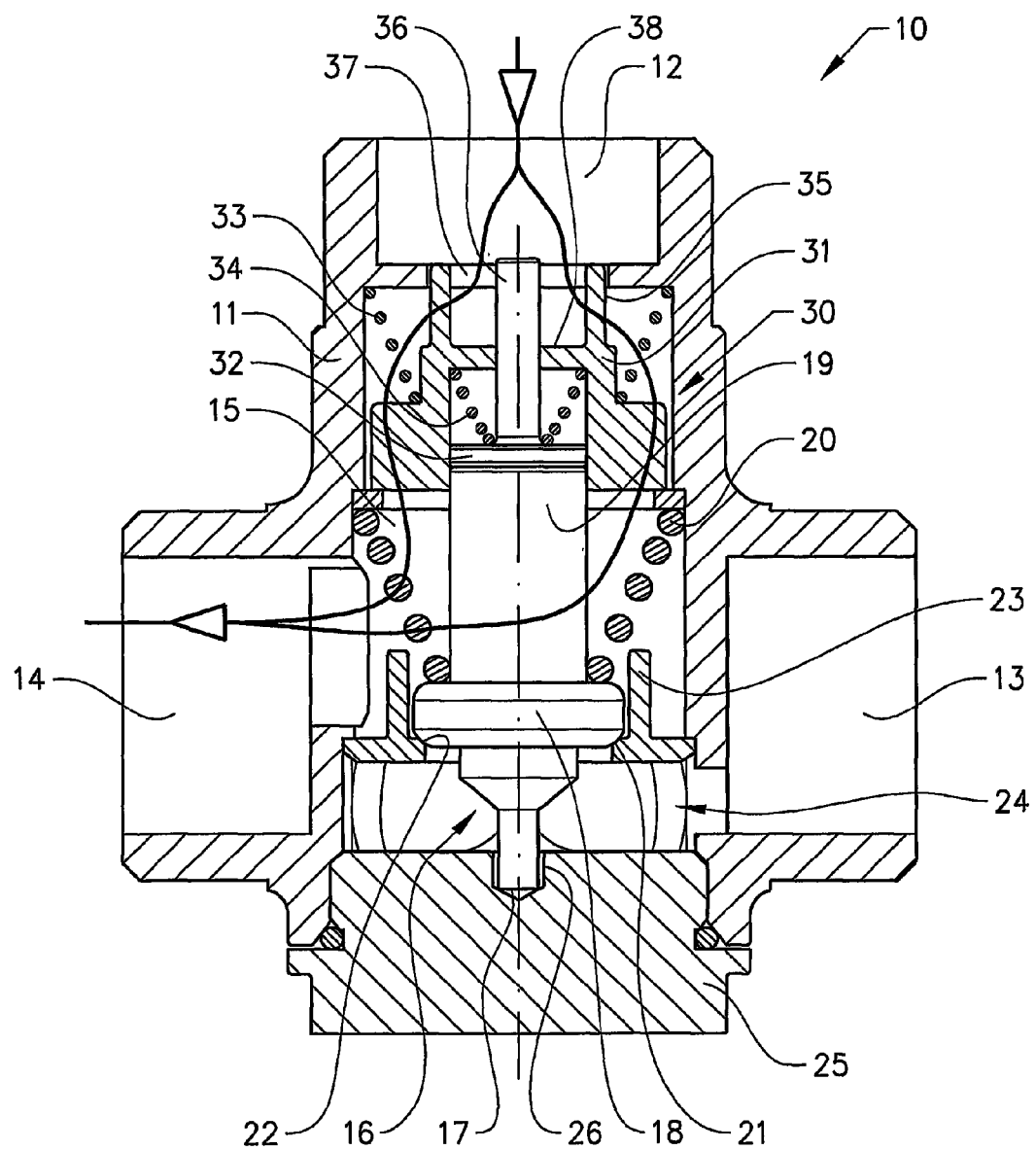
FIGS. 1-3 shows a schematic cross-section of a thermostatic mixing valve according to the invention.
Figure 2:
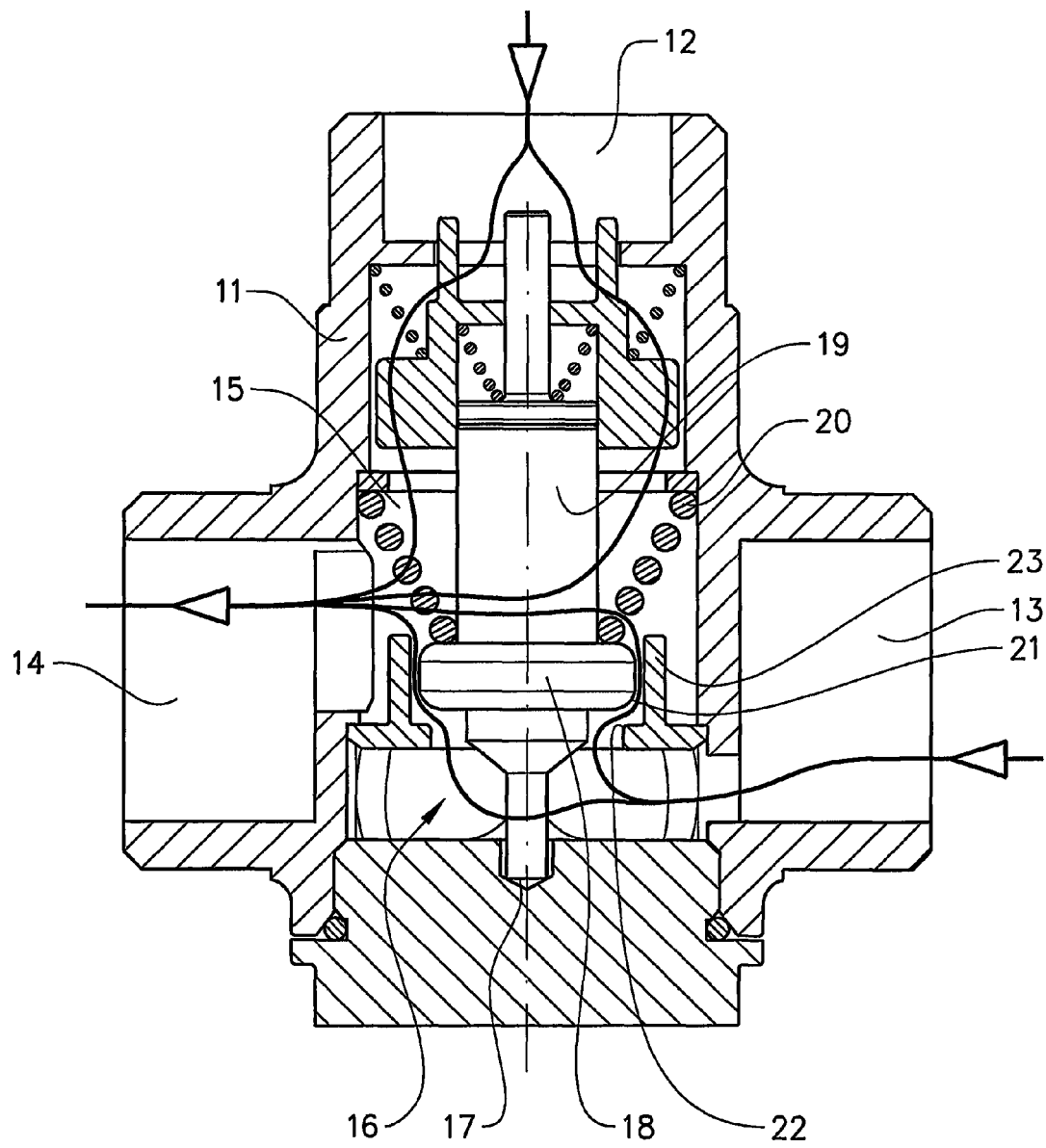
Figure 3:
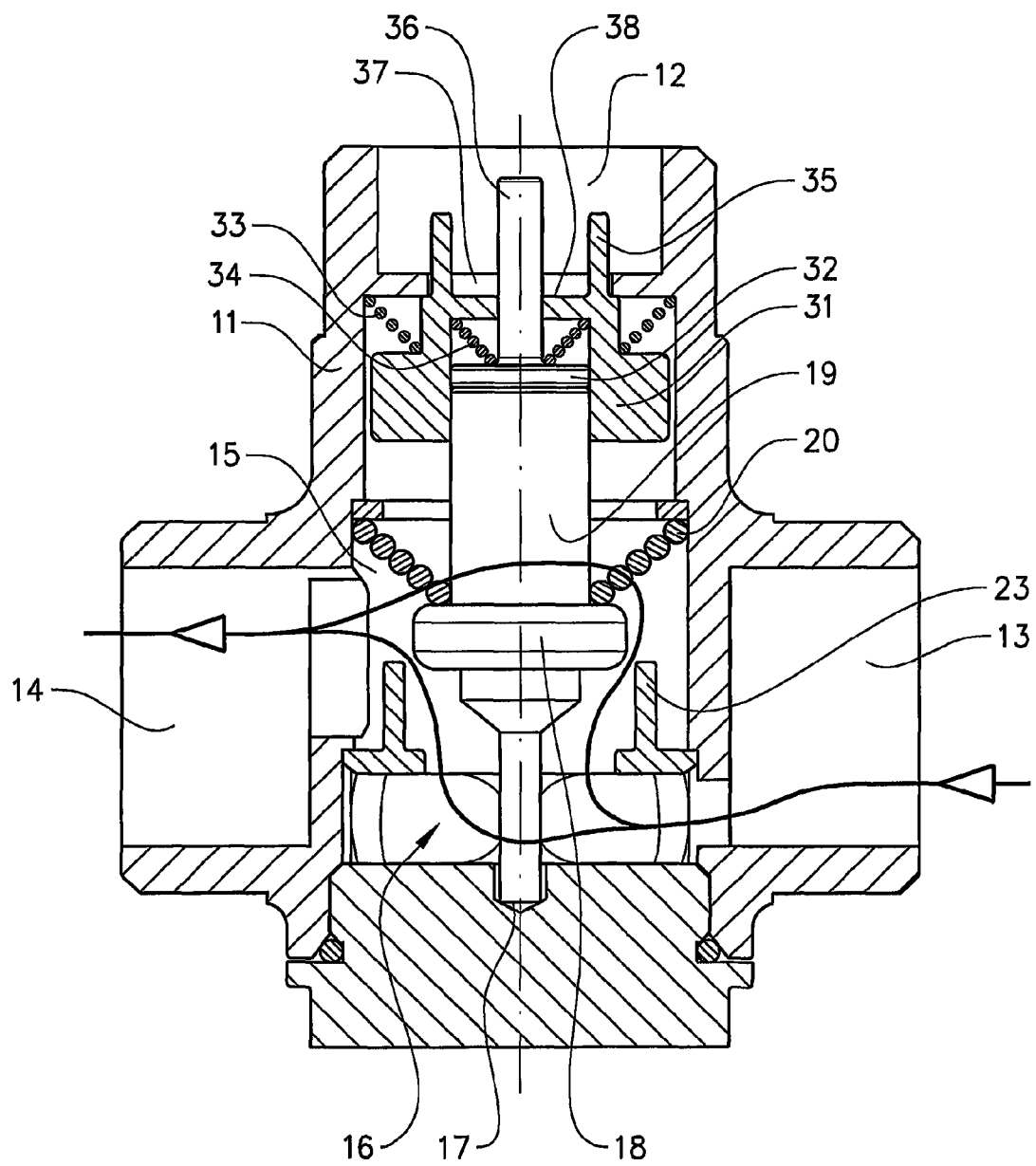

FIGS. 1-3 show a schematic cross-section of a thermostatic mixing valve 10 according to the invention.

The thermostatic mixing valve 10 comprises a hollow body 11 with a cavity having a first inlet 12 and a second inlet 13 for water from separate sources, and an outlet 14 for mixed water. The outlet 14 is in fluid communication with the first inlet 12 and/or the second inlet 13 via a mixing chamber 15. The hollow body 11 is further provided with an axially extending thermostatic actuator 16 comprising a stem 17, an enlarged portion 18 and a heat sensitive bulb 19, said bulb extending into the mixing chamber 15.

The thermostatic actuator 16 is arranged to be axially displaced between a first end position in which only the first inlet 12 is connected to the outlet 14 and a second end position in which only the second inlet 13 is connected to the outlet 14. When the thermostatic actuator 16 is located in any position between the first and second end positions, water flows from both the first inlet 12 and the second inlet 13, is mixed in the mixing chamber 15, and flows out of the thermostatic mixing valve 10 through the outlet 14. The flow rate from each inlet is dependent on the axial position of the thermostatic actuator 16 in the hollow body 11. FIG. 1 shows the thermostatic actuator in its first end position, FIG. 2 shows the thermostatic actuator in an intermediate position and FIG. 3 shows the thermostatic actuator in its second end position. Arrows indicate the direction of flow in each of the positions.

A biasing means in the form of a coil spring 20 is acting on the thermostatic actuator 16 towards the first end position, in which position a portion of the thermostatic actuator 16 is arranged to act as a valve 21 in contact with a valve seat to 22 to close the second inlet 13. As indicated in FIG. 1, a section of the enlarged portion 18 is arranged to contact the valve seat 22 located in the hollow body 11 in order to close the second inlet 13.

The thermostatic actuator 16 is displaced in a sleeve member 23 of larger diameter defining a tubular path which extends coaxially with the enlarged portion 18 for conveying water from the second inlet 13 towards the mixing chamber 15. The sleeve member 23 is arranged to restrict the flow of water from the second inlet 13 past the enlarged portion 18 of the thermostatic actuator 16 during its axial displacement until the thermostatic actuator 16 reaches the second end position. When in the thermostatic actuator 16 is in the second end position, the first inlet 12 is closed and the entire flow of water through the thermostatic mixing valve 10 passes from the second inlet 13, through the mixing chamber and to the outlet 14. In this example, the height of the sleeve 23 is selected such that, when the thermostatic actuator 16 is in the second position, at least a part of the enlarged portion 18 remains below the upper end surface of the sleeve 23.

In the example shown in FIGS. 1-3, the sleeve member 23 is part of a guide body 24 that is inserted into the cavity of the hollow body 11 coaxially with the thermostatic actuator 16. The guide body 24 is positioned against a stop in the cavity and is held in place by an end plug 25, which end plug 25 is provided with a cavity 26 cooperating with the outer end of the stem 17 extending from the thermostatic actuator 16. The cavity is arranged to locate the lower end of the thermostatic actuator 16. The guide body 24 comprises a lower section in fluid communication with the second inlet 13, a central section in which the valve seat 22 is located, and an upper section comprising the sleeve member 23. In this example, the lower, central and upper sections are made as a single component part.

As indicated in FIG. 1, the heat sensitive bulb 19 extending into the hollow body 11 of the thermostatic mixing valve 10 is initially subjected to hot water from the first inlet 12. The water from the first inlet 12 is arranged to flow past a first section of the heat sensitive bulb 19. The valve 21 is arranged to open if the water from the first inlet 12 exceeds a predetermined first temperature $T_1$, by means of the stem 17 acting on the hollow body 11 to displace the thermostatic actuator 16 away from the first end position, as indicated in FIG. 2. Once opened, the degree of opening of the valve 21 is arranged to increase as a function of the temperature of the water from the first inlet 12 and the water from the second inlet 13. As can be seen from FIG. 2, the flow paths from the respective first and second inlets 12, 13 are separated as they flow past the heat sensitive bulb 19, as indicated by the arrows from the respective first and second inlets 12, 13.

As the thermostatic actuator 16 is displaced towards the second end position it will act against the spring force of the coil spring 20. In addition, the outer end of the heat sensitive bulb 19 will act on a sliding valve assembly 30. The sliding valve assembly 30 comprises a first sliding valve 31 that is displaceable relative to the hollow body 11 against a first conical coil spring 33 located between the first sliding valve 31 and the hollow body 11. The first sliding valve 31 has an upper end provided with guide means 35 extending through an opening 37 in the hollow body 11 into the first inlet 12. While the thermostatic actuator 16 is in the first end position or in an intermediate position, water is allowed to flow from the first inlet 12, past the guide means 35 and a number of axial cavities (not shown) in the first sliding valve 31 into the mixing chamber 15. The sliding valve assembly 26 further comprises a second sliding valve 32 that is displaceable relative to the first sliding valve 31 against a second conical coil spring 34 located between the first sliding valve 31 and the second sliding valve 32. The outer end of the heat sensitive bulb 19 and the second sliding valve 32 are located in a cavity in the first sliding valve 31, which cavity is arranged to locate upper end of the thermostatic actuator 16. The second sliding valve 32 has an upper end provided with a stem 36 extending through an opening in the cavity of the first sliding valve 31 towards the first inlet 12. When the thermostatic actuator 16 is displaced into the second end position, a control surface 38 on the upper end of the first sliding valve 31 will come into contact with and close the opening 37 in the hollow body 11 to interrupt the flow of water from the first inlet 12. Should the thermostatic actuator 16 be subjected to heating in excess of the desired design parameters, then the second sliding valve 32 is arranged to take up any additional movement of the thermostatic actuator 16.

The flow of relatively cold water from the second inlet past a second section of the heat sensitive bulb 19 will maintain the thermostatic actuator 16 in a position between the first and second end positions. As a result, the temperature of the water leaving the thermostatic mixing valve 10 through the outlet 14 is always lower than the predetermined first temperature $T_1$ that opens the valve 21 while the thermostatic actuator 16 is located between its end positions As the temperature of the water flowing from the second inlet 13 gradually increases, the thermostatic actuator 16 will continue to be displaced towards the second end position. The thermostatic actuator 16 is arranged to be displaced into the second end position when the water from the second inlet 13 exceeds a predetermined second temperature $T_2$ as indicated in FIG. 3. The predetermined second temperature $T_2$ is preferably selected to be equal to the predetermined first temperature $T_1$.

The rate of flow of water from the second inlet 13 is arranged to be controlled by an annular cross-sectional area A between the enlarged portion 18 of the thermostatic actuator 16 and the sleeve member 23. The annular cross-sectional area A is measured at right angles to the longitudinal axis of the thermostatic actuator 16. The cross-sectional area A is arranged to increase during at least a part of the axial displacement of the thermostatic actuator 16 towards the second end position.

In the example shown in FIG. 1, the enlarged portion of the thermostatic actuator 16 comprises a portion with a constant maximum diameter in the axial extension of the thermostatic actuator 16. A cross-section taken in a plane through the longitudinal axis of the thermostatic actuator 16 illustrates schematically how the inner wall of the sleeve member 23 has a cone angle following a logarithmic function. In this way, the cross-sectional area is arranged to increase according to the said logarithmic function during the entire axial displacement of the thermostatic actuator.

According to an alternative example, the cross-sectional area is arranged to increase at a constant rate, by using a fixed cone angle. In addition, the cross-sectional area can increase by using a fixed cone angle that increases in one or more steps or according to a variable mathematical function, such as a hyperbolic curve. According to a further alternative example, the cross-sectional area is arranged to be constant during an initial part of the axial displacement of the thermostatic actuator.

Figure 4:
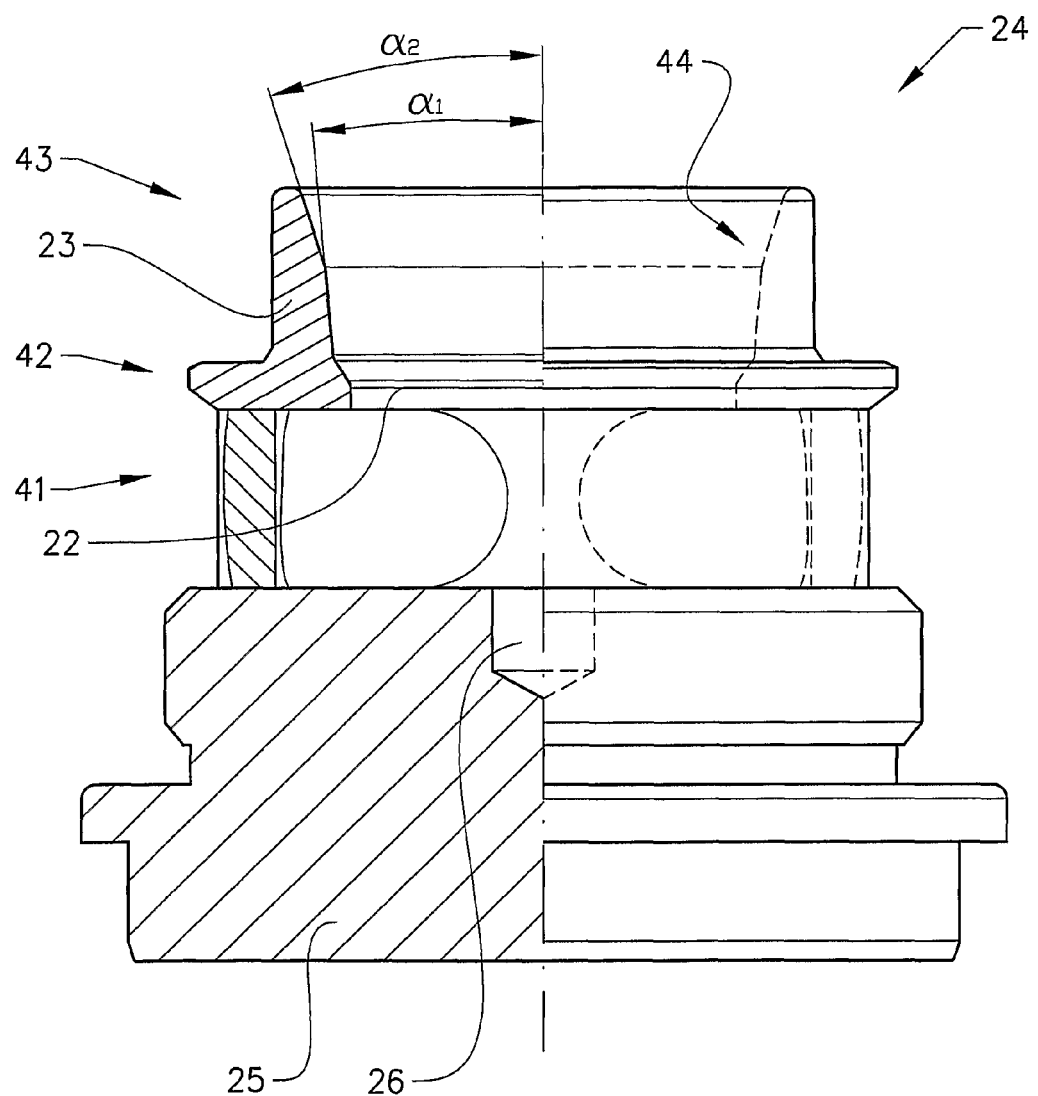
FIG. 4 shows a schematic partial cross-section of a component part of a thermostatic mixing valve according to the invention.

FIG. 4 shows a partial cross-section of a guide body 24 as indicated in FIGS. 1-3. The guide body 24 comprises an end plug 25 is provided with a cavity 26 cooperating with the outer end of the stem extending from the thermostatic actuator (not shown). The cavity 26 is arranged to locate the lower end of the thermostatic actuator. The portion of the guide body 24 extending into thermostatic mixing valve the comprises a lower section 41 arranged to be in fluid communication with the second inlet, a central section 42 in which the valve seat 22 is located, and an upper section 43 comprising the sleeve member 23. In this example, the sleeve member 23 has an inner wall 44 where the cone angle varies in two steps. FIG. 4 indicates a first section having a first cone angle $\alpha_1$ of 5° and a second section having a second cone angle $\alpha_2$ of 15°. As thermostatic actuator is displaced away from the valve seat 22 towards the second end position the annular cross-sectional area between the enlarged portion of the thermostatic actuator and the inner wall of sleeve member is arranged to increase. In the example of FIG. 4, the rate of increase of the annular cross-sectional area follows an approximate logarithmic function.

The thermostatic mixing valve can be provided with a first inlet connected to an outlet from a water heating arrangement, a second inlet connected an outlet from to an accumulator arrangement, and an outlet connected to an inlet for a water heating arrangement. An arrangement of this type is described in detail below.

Figure 5:
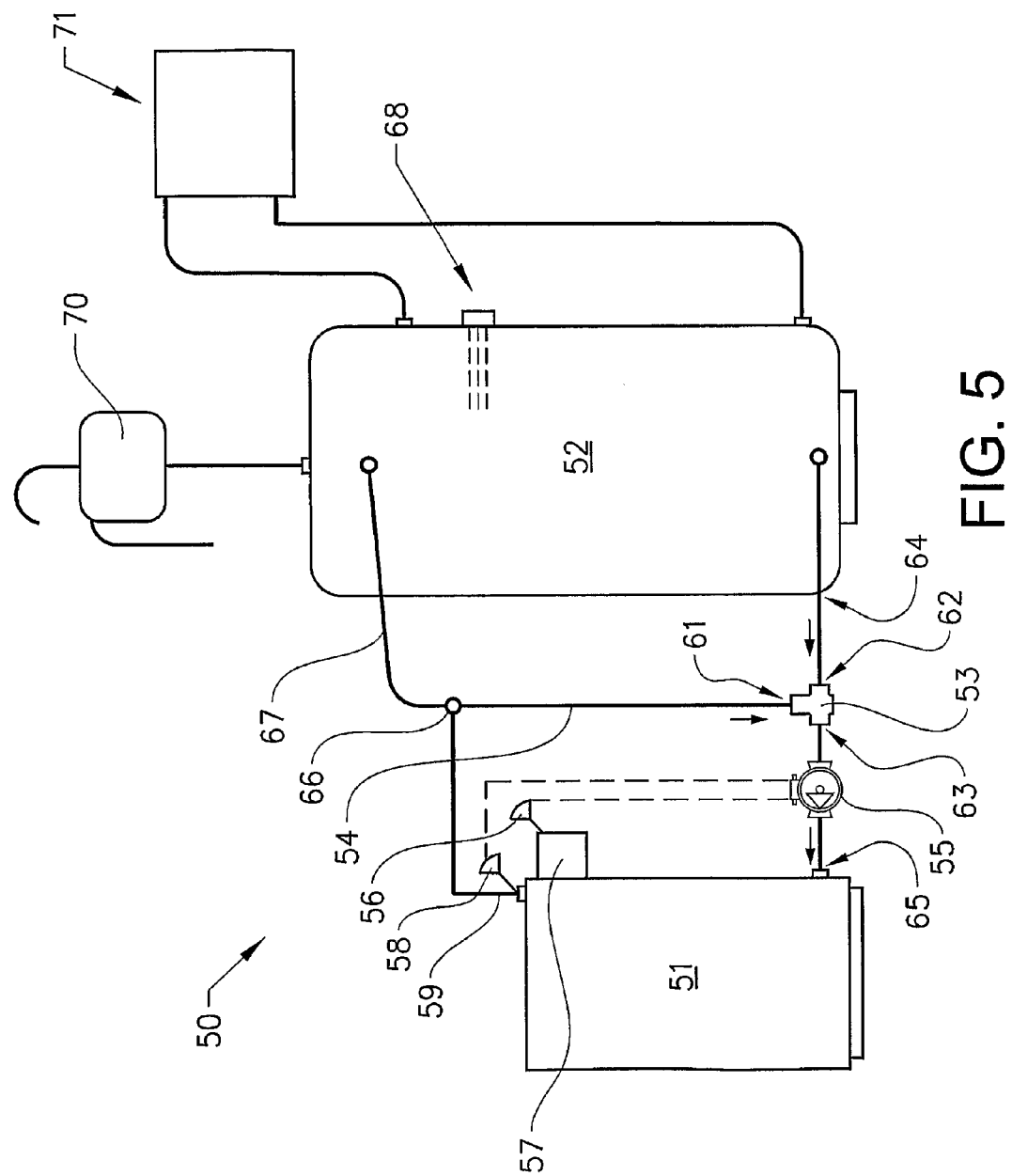
FIG. 5 shows a schematic domestic heating arrangement using a thermostatic mixing valve according to the invention.

FIG. 5 shows a schematic illustration of a domestic heating arrangement 50 comprising a water heating arrangement in the form of a boiler 51 and an accumulator arrangement in the form of an accumulator tank 52 for use with a thermostatic mixing valve 53 according to the invention. The boiler 51 is provided with a bypass circuit 54 through which water is circulated by a water pump 55 when the boiler 51 is being heated to re-fill the accumulator tank 52.

The boiler 51 is provided with a first thermostat 56 located in the flue gas outlet 57. When the temperature of the flue gases reach a predetermined temperature, indicating that the boiler 51 is being heated, the first thermostat 56 will start the pump 55. The water being heated will then begin circulating in the bypass circuit 54 and flow through the thermostatic mixing valve 53. The boiler is also provided with a second thermostat 58 located in the outlet conduit 59 to determine the temperature in the outlet from the boiler 51. At the end of a heating sequence, the heating of the boiler 51 will be ended when the temperature of the water leaving the boiler 51 exceeds a maximum predetermined limit. The second thermostat 56 will also stop the pump 55 when the temperature of the water leaving the boiler 51 drops below a predetermined lower limit.

The boiler 51 and the accumulator tank 52 in this example are connected by a thermostatic mixing valve as described in connection with FIGS. 1-3. According to this embodiment, the thermostatic mixing valve 53 comprises a first inlet 61 connected to the outlet conduit 59 from the boiler 51. A second inlet 62 is connected to an outlet conduit 64 from the lower section of the accumulator tank 52. An outlet 63 from the thermostatic mixing valve 53 is connected to an inlet conduit 65 to the boiler 51 via the pump 55. The bypass circuit 54 is provided with a junction 66 from which an inlet conduit 67 is connected to the upper section of the accumulator tank 52. An optional electric heater 68 can be provided in the accumulator tank 52 in order to maintain a minimum temperature in at least the upper section of the accumulator tank 52 when the boiler 51 is cold or being heated.

As can be seen from FIG. 5, the accumulator tank 52 is also connected to an expansion tank 70 and a heating system 71 comprising at least one radiator to be heated by water from the accumulator tank 52. These are standard components in a domestic heating system and their layout and function will not be described in further detail.

In operation, a temperature sensor in the accumulator tank 52 or the heating system 71 can be used to indicate that the accumulator tank 52 is cold and that a heating sequence is required. The boiler 51 is fired and when the flue gases reach a predetermined temperature the first thermostat 56 will start the pump 55. The water being heated in the boiler 51 will then begin circulating in the bypass circuit 54 and flow through the thermostatic mixing valve 53. Initially the water will flow through first inlet 61 and the outlet 63 to be returned to the boiler 51 (see FIG. 1). At this time, there is no flow through the inlet conduit 67 is connected to the accumulator tank 52.

When the water flowing through the thermostatic mixing valve 53 reaches a predetermined temperature, the thermostatic actuator in the thermostatic mixing valve 53 will open a valve and begin mixing cold water from the outlet conduit 64 from the accumulator tank 52 with the hot water from the boiler 51 at a relatively low flow rate. At the same time, hot water will flow from the boiler 51 through the inlet conduit 67 and into to the accumulator tank 52. The flow rate into the accumulator tank 52 through the inlet conduit 67 and the flow rate out of the accumulator tank 52 through the outlet conduit 64 will be the same. This will cause a slow charging in order to achieve stratification of the hot and cold water in the accumulator tank. In this way, the hot water entering an upper portion of the tank and the cold water in the lower portion of the tank will be separated by a boundary layer.

At the end of the charging of the accumulator tank 52, hot water will reach the lower portion of the said tank. The thermostatic mixing valve 53 will then receive hot water from both the first and the second inlets 61, 62. When the temperature of the water passing through the thermostatic mixing valve 53 exceeds a predetermined temperature, the thermostatic actuator in the thermostatic mixing valve 53 will close a valve and stop the flow through the bypass conduit 54. The entire flow of hot water from the boiler 51 will then pass directly to the accumulator tank 52 and return through the thermostatic mixing valve 53 and the pump 55. This ensures a complete and effective charging of the accumulator tank 52. As described above, the heating of the boiler 51 will be ended when the temperature of the water leaving the boiler 51 exceeds a maximum predetermined limit. The pump 55 will continue to be operated until the second thermostat 56 detects that the temperature of the water leaving the boiler 51 drops below a predetermined lower limit.

The invention is not limited to the above examples, but may be varied freely within the scope of the appended claims.

The invention claimed is:

1. A thermostatic mixing valve, comprising:
a hollow body having a first inlet for water, a second inlet for water, and an outlet for mixed water in fluid communication with the first inlet and/or the second inlet via a mixing chamber, and
an axially extending thermostatic actuator comprising a stem, an enlarged portion and a heat sensitive bulb, said bulb extending into the mixing chamber,
wherein
the thermostatic actuator is arranged to be axially displaced between a first end position in which only the first inlet is connected to the outlet and a second end position in which only the second inlet is connected to the outlet,
a biasing means is configured to act on the thermostatic actuator towards the first end position, in which position a portion of the thermostatic actuator is arranged to act as a valve in contact with a valve seat to close the second inlet,
so that the thermostatic actuator is displaced in a sleeve member of larger diameter defining a tubular path which extends coaxially with the enlarged portion for conveying water from the second inlet towards the mixing chamber,
and wherein said sleeve member is configured to be arranged to restrict the flow of water from the second inlet past the enlarged portion of the thermostatic actuator during its axial displacement until the thermostatic actuator reaches the second end position.

2. The thermostatic mixing valve according to claim 1, wherein the valve is arranged to open if the water from the first inlet exceeds a predetermined temperature.

3. The thermostatic mixing valve according to claim 1, wherein the degree of opening of the valve is arranged to increase as a function of the temperature of the water from at least the first inlet.

4. The thermostatic mixing valve according to claim 1, wherein the degree of opening of the valve is arranged to vary as a function of the temperature of the water from the first inlet and the second inlet.

5. The thermostatic mixing valve according to claim 1, wherein the thermostatic actuator is arranged to be axially displaced to the second end position when the water from the second inlet exceeds a second predetermined temperature.

6. The thermostatic mixing valve according to claim 1, wherein the rate of flow of water from the second inlet is arranged to be controlled by an annular cross-sectional area between the enlarged portion of the thermostatic actuator and the sleeve member, wherein and the cross-sectional area is arranged to increase during at least a part of the axial displacement of the thermostatic actuator towards the second end position.

7. The thermostatic mixing valve according to claim 6, wherein the cross-sectional area is arranged to be constant during an initial part of the axial displacement of the thermostatic actuator.

8. The thermostatic mixing valve according to claim 6, wherein the cross-sectional area is arranged to increase at a constant rate.

9. The thermostatic mixing valve according to claim 6, wherein the cross-sectional area is arranged to increase according to a variable function.

10. The thermostatic mixing valve according to claim 6, wherein the cross-sectional area is arranged to increase according to a logarithmic function.

11. The thermostatic mixing valve according to claim 1, wherein the first inlet is connected to an outlet from a water heating arrangement, the second inlet is connected an outlet from to an accumulator arrangement, and the outlet is connected to an inlet for a water heating arrangement.

12. A domestic heating arrangement comprising a water heating arrangement and an accumulator arrangement, wherein the water heating arrangement and the accumulator arrangement are connected by a thermostatic mixing valve, said thermostatic mixing valve comprising
 a hollow body having a first inlet for water, a second inlet for water, and an outlet for mixed water in fluid communication with the first inlet and/or the second inlet via a mixing chamber, and
 an axially extending thermostatic actuator comprising a stem, an enlarged portion and a heat sensitive bulb, said bulb extending into the mixing chamber, wherein
 the thermostatic actuator is arranged to be axially displaced between a first end position in which only the first inlet is connected to the outlet and a second end position in which only the second inlet is connected to the outlet, and
 a biasing means configured to act on the thermostatic actuator towards the first end position, in which position a portion of the thermostatic actuator is arranged to act as a valve in contact with a valve seat to close the second inlet,
so that the thermostatic actuator is displaced in a sleeve member of larger diameter defining a tubular path which extends coaxially with the enlarged portion for conveying water from the second inlet towards the mixing chamber,
 and wherein said sleeve member is configured to be arranged to restrict the flow of water from the second inlet past the enlarged portion of the thermostatic actuator during its axial displacement until the thermostatic actuator reaches the second end position,
wherein the valve comprises said first inlet connected to an outlet from the water heating arrangement, said second inlet connected to an outlet from the accumulator arrangement, and said outlet connected to an inlet for the water heating arrangement.

* * * * *

UNITED STATES PATENT AND TRADEMARK OFFICE
CERTIFICATE OF CORRECTION

Page 1 of 1

PATENT NO. : 8,640,969 B2
APPLICATION NO. : 13/058994
DATED : February 4, 2014
INVENTOR(S) : Thomasson It is certified that error appears in the above-identified patent and that said Letters Patent is hereby corrected as shown below:

In the claims:

Column 8,
Line 37, "comprising" should read --the mixing valve comprising--.

Column 9,
Line 17, "wherein and the cross-sectional area" should read --wherein the cross-sectional area--.

Signed and Sealed this
Tenth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,640,969 B2  Page 1 of 1
APPLICATION NO. : 13/058994
DATED : February 4, 2014
INVENTOR(S) : Anders Thomasson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 556 days.

Signed and Sealed this
Twenty-second Day of September, 2015

Michelle K. Lee
*Director of the United States Patent and Trademark Office*